(12) United States Patent
Shih

(10) Patent No.: US 10,630,424 B2
(45) Date of Patent: *Apr. 21, 2020

(54) METHODS FOR REDUCING DATA ERRORS IN TRANSCEIVING OF A FLASH STORAGE INTERFACE AND APPARATUSES USING THE SAME

(71) Applicant: Silicon Motion, Inc., Jhubei, Hsinchu County (TW)

(72) Inventor: Fu-Jen Shih, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 60 days.

This patent is subject to a terminal disclaimer.

(21) Appl. No.: 16/013,121

(22) Filed: Jun. 20, 2018

(65) Prior Publication Data

US 2019/0007168 A1 Jan. 3, 2019

Related U.S. Application Data

(60) Provisional application No. 62/527,177, filed on Jun. 30, 2017.

(30) Foreign Application Priority Data

Dec. 29, 2017 (TW) .............................. 106146501 A

(51) Int. Cl.
*H04L 1/00* (2006.01)
*G06F 11/10* (2006.01)
(Continued)

(52) U.S. Cl.
CPC ........ *H04L 1/0061* (2013.01); *G06F 11/1004* (2013.01); *G06F 13/1668* (2013.01); *H04L 1/1607* (2013.01); *H04L 1/203* (2013.01)

(58) Field of Classification Search
CPC ..... H04L 1/0061; H04L 1/203; H04L 1/1607; G06F 11/1004; G06F 13/1668; G06F 11/1068; G11C 29/04; G11C 2029/0411
See application file for complete search history.

(56) References Cited

U.S. PATENT DOCUMENTS 4,764,816 A 8/1988 Heitmann
6,182,264 B1 1/2001 Ott
(Continued)

FOREIGN PATENT DOCUMENTS

CN 1825817 A 8/2006
CN 105761753 A 7/2016
(Continued)

OTHER PUBLICATIONS

"Introduction to the Universal Flash Storage Association;" Universal Flash Storage Association (UFSA); Jun. 2013; pp. 1-11.
(Continued)

*Primary Examiner* — Thien Nguyen
(74) *Attorney, Agent, or Firm* — McClure, Qualey & Rodack, LLP

(57) ABSTRACT

The invention introduces a method for reducing data errors in transceiving of a flash storage interface, performed by a processing unit of a first side, at least including: descrambling first data from a second side via an enabled descrambler of a lowest layer; determining whether a reception error is occurred by continuously monitoring first descrambled data; and when the reception error is occurred, disabling the descrambler of the lowest layer and issuing a first request to the second side for directing the second side to disable a scrambler, thereby disabling the second side to protect second data to be transmitted to the first side by using a data scrambling technique.

16 Claims, 6 Drawing Sheets

(51) Int. Cl.
   *G06F 13/16*   (2006.01)
   *H04L 1/20*    (2006.01)
   *H04L 1/16*    (2006.01)

(56) References Cited

U.S. PATENT DOCUMENTS

| | | | |
|---|---|---|---|
| 8,127,200 B2 | 2/2012 | Sharon et al. | |
| 8,566,676 B2 | 10/2013 | Palanki et al. | |
| 8,914,696 B2 | 12/2014 | Chen et al. | |
| 9,116,824 B2 | 8/2015 | Sharon et al. | |
| 9,170,744 B1 | 10/2015 | Smith | |
| 9,195,537 B2 | 11/2015 | Sharon et al. | |
| 9,203,391 B2 | 12/2015 | Zhu et al. | |
| 9,348,692 B2 | 5/2016 | Chu | |
| 9,640,281 B1 | 5/2017 | Seo et al. | |
| 2002/0191886 A1 | 12/2002 | Castoldi et al. | |
| 2004/0071219 A1 | 4/2004 | Vorenkamp et al. | |
| 2004/0125767 A1 | 7/2004 | Yu et al. | |
| 2006/0034358 A1 | 2/2006 | Okamura | |
| 2008/0034137 A1 | 2/2008 | Whitby-Strevens | |
| 2008/0175163 A1 | 7/2008 | Honary et al. | |
| 2009/0310408 A1 | 12/2009 | Lee et al. | |
| 2010/0138725 A1* | 6/2010 | Ikeda | H03M 13/09 714/781 |
| 2010/0183309 A1* | 7/2010 | Etemad | H04B 10/505 398/79 |
| 2010/0329319 A1 | 12/2010 | Dai et al. | |
| 2012/0076301 A1* | 3/2012 | Kanter | H04K 1/02 380/256 |
| 2012/0113732 A1 | 5/2012 | Sohn et al. | |
| 2012/0296658 A1* | 11/2012 | Smyth | G10L 19/22 704/500 |
| 2013/0107772 A1 | 5/2013 | Splitz et al. | |
| 2013/0142226 A1 | 6/2013 | Sasaki et al. | |
| 2014/0031845 A1 | 1/2014 | Rynerson | |
| 2014/0068365 A1 | 3/2014 | Chen et al. | |
| 2014/0156924 A1 | 6/2014 | Jeon et al. | |
| 2014/0173369 A1* | 6/2014 | Chen | G11C 7/24 714/718 |
| 2014/0310536 A1 | 10/2014 | Shacham | |
| 2015/0003277 A1 | 1/2015 | Wellington | |
| 2015/0032913 A1 | 1/2015 | Kim et al. | |
| 2015/0032915 A1 | 1/2015 | Hur et al. | |
| 2016/0028491 A1 | 1/2016 | Oe | |
| 2016/0105296 A1 | 4/2016 | Berke et al. | |
| 2016/0170824 A1 | 6/2016 | Hamo | |
| 2016/0239235 A1 | 8/2016 | Chung et al. | |
| 2016/0378582 A1 | 12/2016 | Choi et al. | |
| 2017/0346596 A1 | 11/2017 | Desimone et al. | |
| 2018/0196710 A1* | 7/2018 | Iyer | H04L 1/00 |
| 2018/0375695 A1* | 12/2018 | Whitby-Strevens | G09G 5/006 |

FOREIGN PATENT DOCUMENTS

| | | |
|---|---|---|
| CN | 105786749 A | 7/2016 |
| CN | 106850476 A | 6/2017 |
| TW | 200845012 A | 11/2008 |
| TW | 201250462 A | 12/2012 |
| TW | 201304429 A | 1/2013 |
| TW | 201405562 A | 2/2014 |
| TW | 201503153 A | 1/2015 |
| TW | 201506953 A | 2/2015 |

OTHER PUBLICATIONS

Non-Final Office Action dated Oct. 25, 2019, issued in U.S. Appl. No. 16/013,133 (copy not provided).
Non-Final Office Action dated Dec. 5, 2019, issued in U.S. Appl. No. 16/013,091 (copy not provided).

\* cited by examiner

METHODS FOR REDUCING DATA ERRORS IN TRANSCEIVING OF A FLASH STORAGE INTERFACE AND APPARATUSES USING THE SAME

CROSS REFERENCE TO RELATED APPLICATIONS

This Application claims benefit of U.S. Provisional Application No. 62/527,177, filed on Jun. 30, 2017, and priority of Taiwan Patent Application No. 106146501, filed on Dec. 29, 2017, the entirety of which are incorporated by reference herein.

BACKGROUND

Technical Field

The present invention relates to flash memory, and in particular to methods for reducing data errors in transceiving of a flash storage interface and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

A flash memory device typically contains a device side and a storage unit and connects to a host side via a flash storage interface. As advances have been made in the data transmission rate of flash storage interfaces, data errors have occurred more frequently. Accordingly, what is needed are methods for reducing data errors in transceiving of a flash storage interface and apparatuses that use these methods.

BRIEF SUMMARY

An embodiment of the invention introduces a method for reducing data errors in transceiving of a flash storage interface, performed by a processing unit of a first side, at least including: descrambling first data from a second side via an enabled descrambler of a lowest layer; determining whether a reception error is occurred by continuously monitoring first descrambled data; and when the reception error is occurred, disabling the descrambler of the lowest layer and issuing a first request to the second side for directing the second side to disable a scrambler, thereby disabling the second side to protect second data to be transmitted to the first side by using a data scrambling technique.

An embodiment of the invention introduces a method for reducing data errors in transceiving of a flash storage interface, performed by a processing unit of a first side, at least including: when a scrambler of the first side is enabled, repeatedly determining whether a disabling request is received from a second side; when the disabling request is received from the second side, disabling the scrambler; when the scrambler of the first side is disabled, repeatedly determining whether an enabling request is received from the second side; and when the enabling request is received from the second side, enabling the scrambler.

An embodiment of the invention introduces an apparatus for reducing data errors in transceiving of a flash storage interface at least including the lowest layer coupled to a peer side, and a processing unit coupled to the lowest layer. The processing unit descrambles first data from the peer side via an enabled descrambler of the lowest layer; determines whether a reception error is occurred by continuously monitoring first descrambled data; and when the reception error is occurred, disables the descrambler of the lowest layer and issues a first request to the peer side for directing the peer side to disable a scrambler, thereby disabling the peer side to protect second data to be transmitted to the apparatus by using a data scrambling technique.

An embodiment of the invention introduces an apparatus for reducing data errors in transceiving of a flash storage interface at least including the lowest layer coupled to a peer side, and a processing unit coupled to the lowest layer. The processing unit repeatedly determines whether a disabling request is received from the peer side when the scrambler is enabled; disables the scrambler when the disabling request is received from the peer side; repeatedly determines whether an enabling request is received from the peer side when the scrambler is disabled; and enables the scrambler when the enabling request is received from the peer side.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
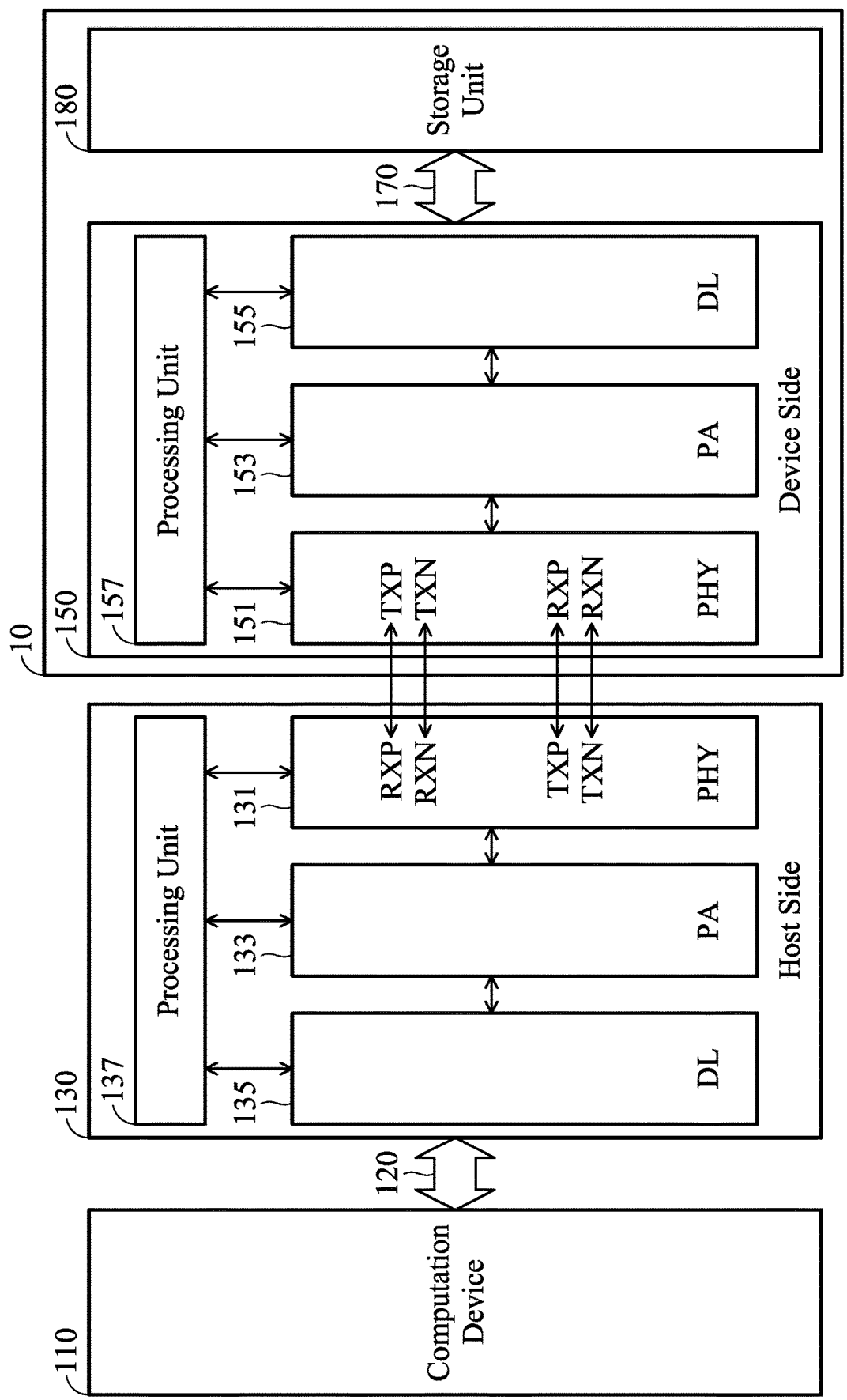
FIG. 1 is the system architecture for a flash memory according to an embodiment of the invention.

FIG. 1 is the system architecture for a flash memory according to an embodiment of the invention. The systems architecture of the flash memory may contain a device side 150 that communicates with a host side 130 through a UFS (Universal Flash Storage) interface. UFS is a common flash storage specification to bring higher data transfer speed and increased reliability to flash memory storage and remove the need for different adapters for different types of flash storage units. The flash memory may be equipped with a digital camera, a mobile phone, a consumer electronic device or others. The UFS interface may operate at PWM (Pulse-Width Modulation) and HS (high-speed) gears. The PWM gear may be 1 Gbps or lower while the HS gear may be 1.4 Gbps or higher. The PWM gear may be referred to as a low speed gear. For example, the data rates of different HS-GEARs defined in the UFS specification are listed in Table 1:

TABLE 1

| RATE A-series (Mbps) | RATE B-series (Mbps) | High-Speed GEARs |
|---|---|---|
| 1248 | 1457.6 | HS-G1 (A/B) |
| 2496 | 2915.2 | HS-G2 (A/B) |
| 4992 | 5830.4 | HS-G3 (A/B) |

For example, the rate A of HS-G1 gear is 1248 Mbps (megabits per second), the rate B of HS-G1 gear is 1457.6 Mbps, the rate A of HS-G2 gear is 2496 Mbps, the rate B of HS-G2 gear is 2915.2 Mbps, the rate A of HS-G3 gear is 4992 Mbps and the rate B of HS-G3 gear is 5830.4 Mbps. The data rates of different PWM-GEARs defined in the UFS specification are listed in Table 2:

TABLE 2

| PWM-GEARs | Min. (Mbps) | Max. (Mbps) |
|---|---|---|
| PWM-G0 | 0.01 | 3 |
| PWM-G1 | 3 | 9 |
| PWM-G2 | 6 | 18 |
| PWM-G3 | 12 | 36 |
| PWM-G4 | 24 | 72 |
| PWM-G5 | 48 | 144 |
| PWM-G6 | 96 | 288 |
| PWM-G7 | 192 | 576 |

For example, the data rate of PWM-G0 gear is ranging from 0.01 to 3 Mbps, the data rate of PWM-G1 is ranging from 3 to 9 Mbps, the data rate of PWM-G2 is ranging from 6 to 18 Mbps, and the rest can be deduced according to Table 2.

The flash memory 10 further contains a storage unit 180 and the device side 150 may communicate with the storage unit 180 using a DDR (Double Data Rate) protocol, such as ONFI (open NAND flash interface), DDR toggle, or others. Specifically, a processing unit 157 of the device side 150 writes data into a designated address of a storage unit 180, and reads data from a designated address thereof through the access interface 170. The access interface 170 uses several electrical signals for coordinating commands and data transfer between the processing unit 157 of the device side 150 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc.

Figure 2:
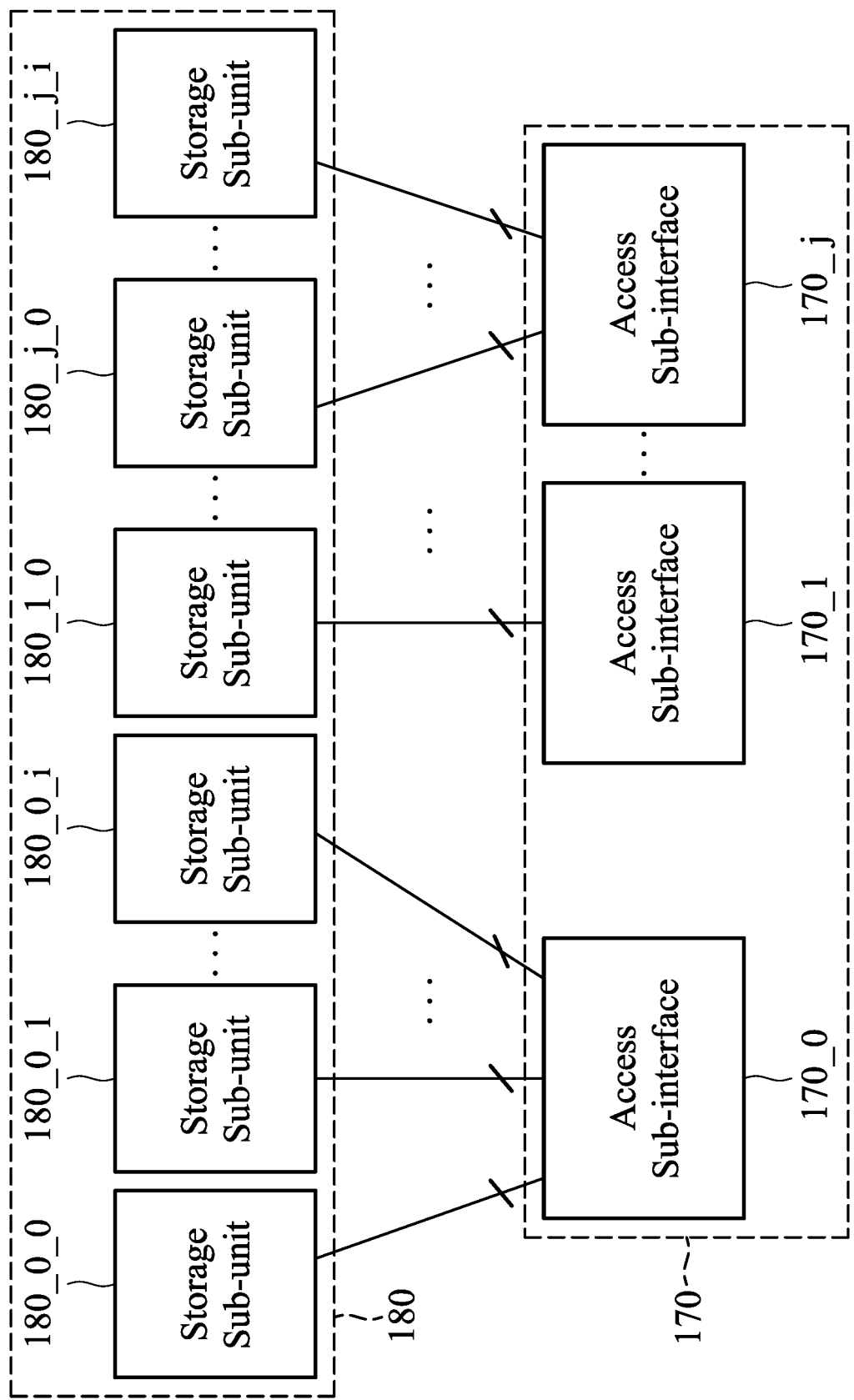
FIG. 2 is a schematic diagram illustrating interfaces to storage units of a flash storage according to an embodiment of the invention.
Figure 3:
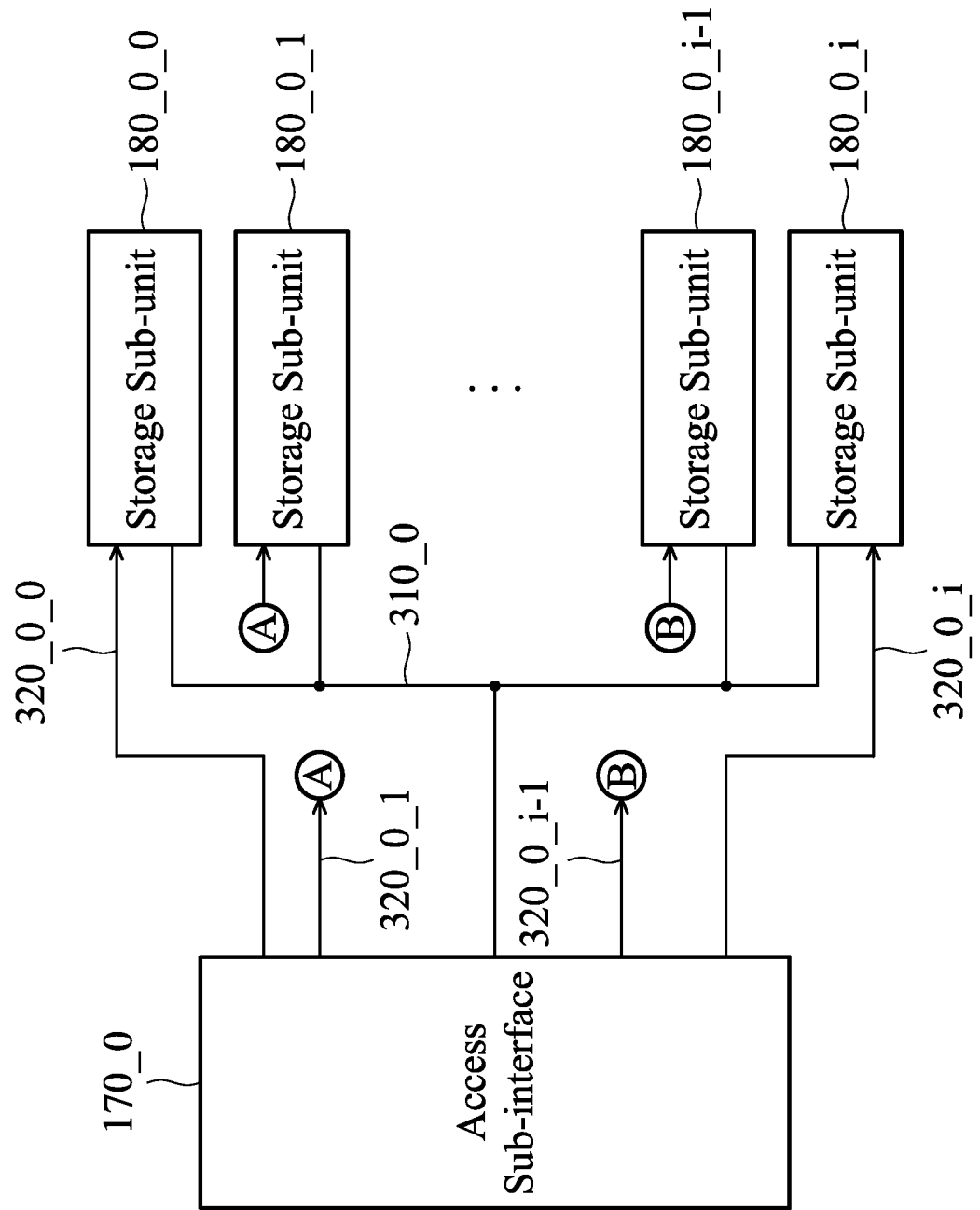
FIG. 3 is a schematic diagram depicting connections between one access sub-interface and multiple storage sub-units according to an embodiment of the invention.

The storage unit 180 may contain multiple storage sub-units and each storage sub-unit may be practiced in one or more dies and use an access sub-interface to communicate with the processing unit 157. FIG. 2 is a schematic diagram illustrating interfaces to storage units of a flash storage according to an embodiment of the invention. The flash memory may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory has 16 storage sub-units 180_0_0 to 180_j_i in total. The processing unit 157 may direct one of the access sub-interfaces 170_0 to 170_j to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of channels may be provided in the flash memory, and each channel may be associated with any number of storage sub-units, and the invention should not be limited thereto. FIG. 3 is a schematic diagram depicting connections between one access sub-interface and multiple storage sub-units according to an embodiment of the invention. The processing unit 157, through the access sub-interface 170_0, may use independent CE control signals 320_0_0 to 320_0_i to select one of the connected storage sub-units 180_0_0 and 180_0_i, and then read data from or program data into the designated location of the selected storage sub-unit via the shared data line 310_0.

The processing unit 137 of the host side 130 may communicate with a computation device 110 through a standard protocol, such as USB (Universal Serial Bus), ATA (Advanced Technology Attachment), SATA (Serial ATA), PCI-E (Peripheral Component Interconnect Express) or others.

The host side 130 and the device side 150 may contain UIC (UFS Interconnect) layers, respectively. UIC layer is the lowest layer of UFS layered architecture and handles connections between the host side 130 and the device side 150. The UIC layer of the host side 130 may contain a PHY (physical) (L1) layer 131, a PA (physical adapter) (L1.5) layer 133 and a DL (data link) (L2) layer 135. The UIC layer of the device side 150 may contain a PHY (L1) layer 151, a PA (L1.5) layer 153 and a DL (L2) layer 155. Each of the PHY layers 131 and 151 may use a differential output pair (such as, TXP and TXN as shown in FIG. 1) to transmit data to a peer side and a differential input pair (such as, RXP and RXN as shown in FIG. 1) to receive data from the peer side. For example, the PHY layer 131 of the host side 130 may transmit data to the device side 150 via the differential output pair and receive data from the device side 150 via the differential input pair. On the other hand, the PHY layer 151 of the device side 150 may transmit data to the host side 130 via the differential output pair and receive data from the host side 130 via the differential input pair.

Any of the host side 130 and the device side 150 (also referred to as a receiver side) operating at a high or low speed gear may descramble data received from a peer side (also referred to as a transmitter side) via a descrambler of the lowest layer, determine whether errors are detected from the descrambled data (that is, a reception error is occurred), and disable the descrambler and direct the peer side to disable its scrambler when the errors are detected from the descrambled data. For example, the host side 130 may descramble data received from the device side 150 to obtain a data frame and/or a control frame, determine whether the data frame and/or the control frame fails to be descrambled, and disable the descrambler and direct the device side to disable its scrambler when the data frame and/or the control frame fails to be descrambled, and vice versa. On the other hand, when the descrambler of the lowest layer of the receiver side is disabled (that is, the scrambler of the lowest layer of the peer side is disabled neither), the receiver side may continuously monitor a received data frame and/or a control frame. The receiver side may enable the descrambler and direct the peer side to enable its scrambler when no error is detected from the received data. For example, the host side 130 may continuously monitor a received data frame and/or a control frame when the descrambler of the lowest layer of the host side 130 is disabled, and then, the host side 130 may enable the descrambler and direct the device side 150 to enable its scrambler when no error is detected from the received data, and vice versa. The scrambler may be implemented in hardware circuits of the PA layer of the transmitter side while the descrambler may be implemented in hardware circuits of the PA layer of the receiver side. The scrambler encodes a message to make the message unknown at a receiver side not equipped with an appropriate descrambler. It should be noted that, although it can improve data security by scrambling data, the possibility of occurrence of error bits may be increased in data transmission.

Figure 4:
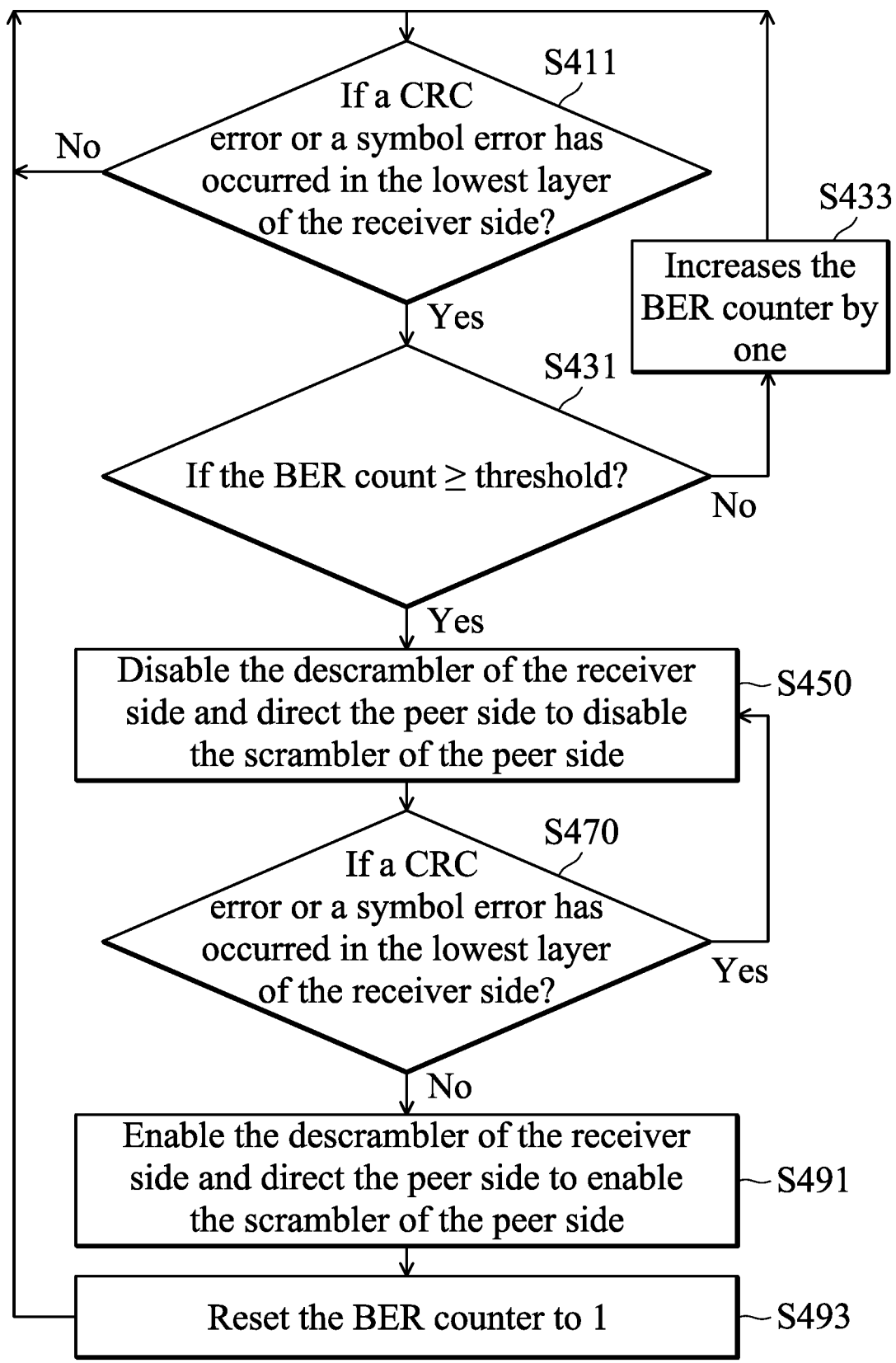
FIG. 4 is a flowchart illustrating a method for adjusting a data transceiving setting by a receiver side according to an embodiment of the invention.
Figure 5:
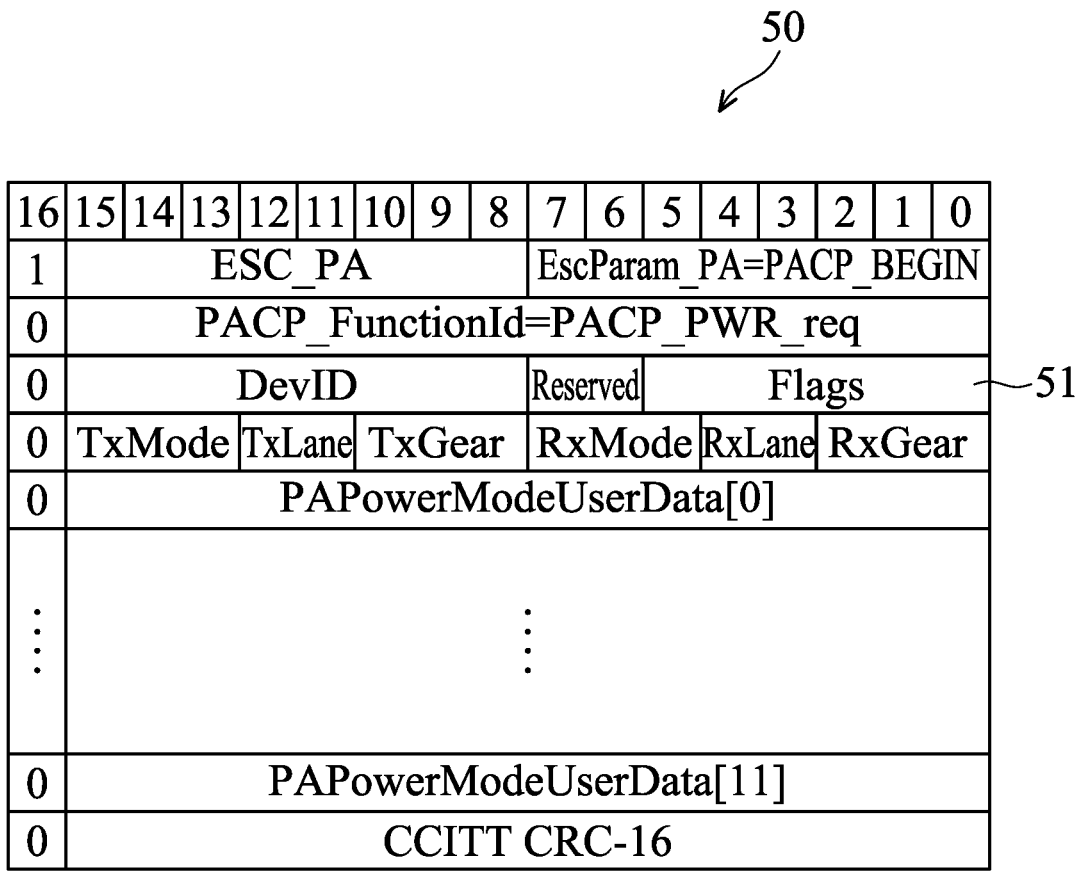
FIG. 5 illustrates the data structure of a PACP_PWR_req frame according to an embodiment of the invention.
Figure 6:
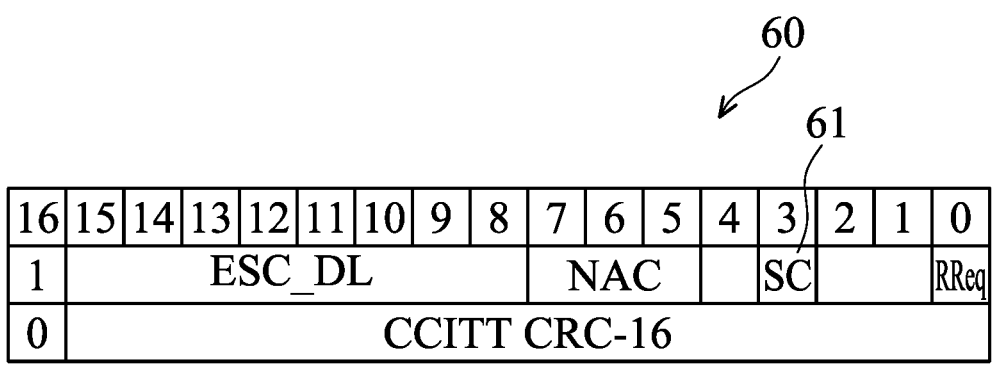
FIG. 6 illustrates the data structure of a NAC frame according to an embodiment of the invention.

FIG. 4 is a flowchart illustrating a method for adjusting a data trasceiving setting by a receiver side according to an embodiment of the invention. The method may be realized when the processing unit 137 or 157 loads and executes relevant microcodes or software instructions. The processing unit of the receiver side may be implemented in a general-purposed processor, a microcontroller, a MCU (microcontroller unit), etc., when loading and executing the relevant firmware of a non-volatile memory of the receiver side. The processing unit of the receiver side may continuously receive data via the differential input pair from the other side (referred to as a transmitter side or a peer side) and obtain descrambled data of that received from the peer side via the enabled descrambler of the lowest layer. The processing unit of the receiver side determines whether a CRC (Cyclic Redundancy Check) error has occurred in the PA layer of the receiver side or a symbol error has occurred in the PHY layer of the receiver side (step S411). When no CRC error is detected from the descrambled data and no symbol error is detected (the "no" path of step S411), the next iteration of the determination is performed (step S411). Since the error of the received data may be happened occasionally, the processing unit of the receiver side may maintain a BER (Bit Error Rate) counter (initialized to 1) for recording the total number of occurrences of CRC errors and/or the symbol errors. After detecting that the CRC/symbol error has occurred a specified number of times, the data transceiving setting is adjusted. When a CRC error of the descrambled data or a symbol error is detected (the "Yes" path of step S411), the processing unit of the receiver side further determines whether the BER count reaches or is greater than a predefined threshold (e.g. an arbitrary integer ranging from 2 to 10) (step S431). When the BER count is lower than the predefined threshold (the "No" path of step S431), the process increases the BER counter by one (step S433) and performs the determination for the next data reception (step S411). When the BER count reaches or is greater than a predefined threshold (the "Yes" path of step S431), the processing unit of the receiver side disables the descrambler of the PA layer of the receiver side and directs the processing unit of the peer side to disable the scrambler of the PA layer of the peer side (step S450). In step S450, the receiver side may issue a request to the peer side via the UIC layer to advise the peer side to disable the scrambler of the PA layer of the peer side. In some embodiments, the request may be carried in a PACP_PWR_req (power mode change request) frame, a NAC (negative acknowledgement control) frame, or others. FIG. 5 illustrates the data structure of a PACP_PWR_req frame according to an embodiment of the invention. The $0^{th}$ to $5^{th}$ bits of the $2^{nd}$ symbol of the PACP_PWR_req frame indicate a Flags field 51. The processing unit of the receiver side may change the $i^{th}$ bit of the Flags field 51 of the PACP_PWR_req frame 50 (for example, the $5^{th}$ bit) to "0", i is an arbitrary integer ranging from 0 to 5, for directing the peer side to disable the scrambler, that is, not to protect data to be transmitted to the receiver side by using a data scrambling technique. FIG. 6 illustrates the data structure of a NAC frame according to an embodiment of the invention. The length of the NAC frame 60 is two symbols and each symbol is 16 bits. The $1^{st}$ to $4^{th}$ bits of the $0^{th}$ symbol of the NAC frame 60 indicate a reserved field 61. The processing unit of the receiver side may set the $j^{th}$ bit (for example, the $2^{nd}$ bit) to "0", j is an arbitrary integer ranging from 0 to 3, for directing the peer side to disable the scrambler, that is, not to protect data to be transmitted to the receiver side by using a data scrambling technique. In other words, the processing unit of the receiver side confirms that an error of the received data has occurred after detecting a CRC/symbol error a specified number of times.

In alternative embodiments, the processing unit of the receiver side may not maintain the BER counter and omit steps S431 and S433. In other words, after detecting a CRC or symbol error, the processing unit of the receiver side determines that an error of the received data has occurred.

When the descrambler of the PA layer of the receiver is disabled, the processing unit of the receiver may continuously receive data via the differential input pair from the peer side and determine whether a CRC error has occurred in the PA layer of the receiver side or a symbol error has occurred in the PHY layer of the receiver side (step S470). When detecting a CRC or symbol error (the "Yes" path of step S470), the processing unit of the receiver side still disables the descrambler of the PA layer of the receiver and directs the processing unit of the peer side to still disable the scrambler of the PA layer of the peer side (step S450). When detecting no CRC or symbol error (the "No" path of step S470), the processing unit of the receiver side enables the descrambler of the PA layer of the receiver and directs the processing unit of the peer side to enable the scrambler of the PA layer of the peer side (the step S491) and resets the BER counter to 1 (step S493). In step S491, the receiver side may issue a request to the peer side via the UIC layer to advise the peer side to enable the scrambler of the PA layer of the peer side. In some embodiments, the request may be carried in a PACP_PWR_req frame, a NAC frame, or others. Refer to FIG. 5. The processing unit of the receiver side may change the $i^{th}$ bit of the Flags field 51 of the PACP_PWR_req frame 50 to "1" for directing the peer side to enable the scrambler, that is, to protect data to be transmitted to the receiver side by using a data scrambling technique. Refer to FIG. 6. The processing unit of the receiver side may change the $j^{th}$ bit of the Flags field 61 of the NAC frame 60 to "1" for directing the peer side to enable the scrambler, that is, to protect data to be transmitted to the receiver side by using a data scrambling technique.

Figure 7:
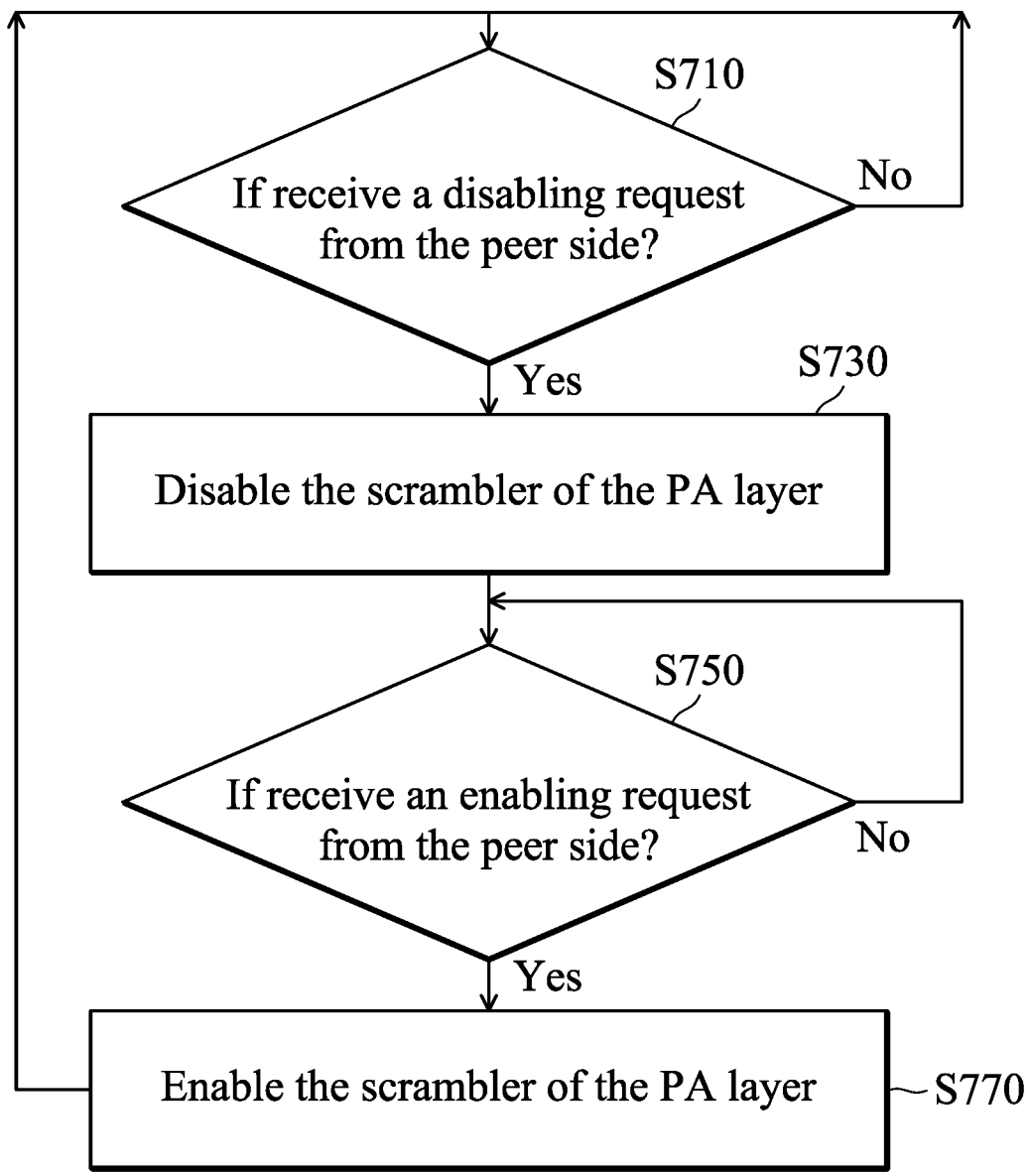
FIG. 7 is a flowchart illustrating a method for adjusting a data transceiving setting by a transmitter side according to an embodiment of the invention.

FIG. 7 is a flowchart illustrating a method for adjusting a data trasceiving setting by a transmitter side according to an embodiment of the invention. The method may be realized when the processing unit 137 or 157 loads and executes relevant microcodes or software instructions. The processing unit of the transmitter side may be implemented in a general-purposed processor, a microcontroller, a MCU (microcontroller unit), etc., when loading and executing the relevant firmware of a non-volatile memory of the transmitter side. When the scrambler of the PA layer of the transmitter side is enabled, the processing unit of the transmitter side repeatedly determines whether a disabling request is received from a peer side (also referred to as a receiver side) (step S710). The disabling request may be carried in the $i^{th}$ bit (for example, the $5^{th}$ bit) of the Flags field 51 of the PACP_PWR_req frame 50 as shown in FIG. 5 or the $j^{th}$ bit (for example, the $2^{nd}$ bit) of the reserved field 61 of the NAC frame 60. When a disabling request is received from the peer side (the "Yes" path of step S710), the processing unit of the transmitter side disables the scrambler of the PA layer (step S730). When the scrambler of the PA layer of the transmitter side is disabled, the processing unit of the transmitter side repeatedly determines whether an enabling request is received from the peer side (step S750). The enabling request may be carried in the $i^{th}$ bit (for example, the $5^{th}$ bit) of the Flags field 51 of the PACP_PWR_req frame 50 as shown in FIG. 5 or the $j^{th}$ bit (for example, the $2^{nd}$ bit) of the reserved field 61 of the NAC frame 60. When an enabling request is received from the peer side (the "Yes" path of step S750), the processing unit of the transmitter side enables the scrambler of the PA layer (step S770).

Although the embodiment has been described as having specific elements in FIGS. 1 to 3, it should be noted that additional elements may be included to achieve better performance without departing from the spirit of the invention. While the process flows described in FIGS. 4 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing data errors in transceiving of a flash storage interface, performed by a processing unit of a receiver side of the flash storage interface, the method comprising:
descrambling first data from a transmitter side of the flash storage interface via an enabled descrambler of a lowest layer of the receiver side, wherein the lowest layer is a UIC (UFS Interconnect) layer and the UIC layer comprises a PHY (physical) layer and a PA (physical adapter) layer;
detecting CRC (Cyclic redundancy check) errors in the descrambled first data by the PA layer and detecting symbol errors in the first data by the PHY layer;
counting a total number of occurrences of the detected CRC errors and symbol errors;
determining whether the total number of CRC errors and symbol errors in the first data has reached a threshold; and
when the total number of CRC errors and symbol errors has reached the threshold, disabling the descrambler of the lowest layer and issuing a first request to the transmitter side for directing the transmitter side to disable a scrambler of the transmitter side, thereby disabling the transmitter side to protect second data to be transmitted to the receiver side by using a data scrambling technique,
wherein the first request is carried in a bit of a Flags field of a power mode change request frame or a bit of a reserved field of a negative acknowledgement control frame.

2. The method of claim 1, wherein the first side communicates with the transmitter side via a UFS (Universal Flash Storage) interface.

3. The method of claim 2, wherein the threshold is equal to 1.

4. The method of claim 2, wherein the threshold is an integer between 2 and 10.

5. The method of claim 4, wherein a BER (Bit Error Rate) counter records the total number of occurrences of CRC errors and/or symbol errors, and the method further comprises:
increasing the BER counter by one when detecting any one of the CRC errors or symbol errors.

6. The method of claim 1, comprising:
when the descrambler is disabled, repeatedly determining, by the processing unit of the receiver side, whether no CRC error or symbol error is occurred for the second data received from the transmitter side; and
when no CRC error or symbol error is occurred for the second data, enabling the descrambler of the lowest layer and issuing a second request to the transmitter side for directing the transmitter side to enable the scrambler, thereby enabling the transmitter side to protect the first data to be transmitted to the receiver side by using the data scrambling technique.

7. The method of claim 6, wherein the second request is carried in another bit of the Flags field of the power mode change request frame or another bit of the reserved field of the negative acknowledgement control frame.

8. A method for reducing data errors in transceiving of a flash storage interface, performed by a processing unit of a receiver side of the flash storage interface, the method comprising:

when a scrambler of the receiver side is enabled, repeatedly determining whether a disabling request is received from a transmitter side of the flash storage interface;

when the disabling request is received from the transmitter side by the receiver side, disabling the scrambler;

when the scrambler of the receiver side is disabled, repeatedly determining whether an enabling request is received from the transmitter side by the receiver side; and when the enabling request is received from the transmitter side by the receiver side, enabling the scrambler, wherein the enabling request and the disabling request are carried in a bit of a Flags field of a power mode change request frame or a bit of a reserved field of a negative acknowledgement control frame.

9. An apparatus for reducing data errors in transceiving of a flash storage interface, comprising:

a lowest layer, coupled to a peer side, comprising a descrambler; and a processing unit, coupled to the lowest layer, descrambling first data from the peer side via an enabled descrambler of the lowest layer, wherein the lowest layer is a UIC (UFS Interconnect) layer and the UIC layer comprises a PHY (physical) layer and a PA (physical adapter) layer, wherein the PA layer detects CRC (Cyclic redundancy check) errors in the descrambled first data, and the PHY layer detects symbol errors in the first data, wherein the processing unit is configured to count a total number of occurrences of the detected CRC errors and symbol errors, and determine whether the total number of CRC errors and symbol errors has reached a threshold;

wherein when the total number of CRC errors and symbol errors has reached the threshold, the processing unit is configured to disable the descrambler of the lowest layer and issuing a first request to the peer side for directing the peer side to disable a scrambler of the peer side, thereby disabling the peer side to protect second data to be transmitted to the apparatus by using a data scrambling technique, wherein the first request is carried in a bit of a Flags field of a power mode change request frame or a bit of a reserved field of a negative acknowledgement control frame.

10. The apparatus of claim 9, wherein the apparatus communicates with the peer side via a UFS (Universal Flash Storage) interface.

11. The apparatus of claim 10, wherein the threshold is equal to 1.

12. The apparatus of claim 10, wherein the threshold is an integer between 2 and 10.

13. The apparatus of claim 12, wherein a BER (Bit Error Rate) counter records the total number of occurrences of CRC errors and/or symbol errors, and the processing unit increases the BER counter by one when detecting any one of the CRC errors or symbol errors.

14. The apparatus of claim 9, wherein the processing unit repeatedly determines whether no CRC error or symbol error is occurred for the second data received from the peer side when the descrambler is disabled; and enables the descrambler of the lowest layer and issues a second request to the peer side for directing the peer side to enable the scrambler when no CRC error or symbol error is detected for the second data, thereby enabling the peer side to protect the first data to be transmitted to the apparatus by using the data scrambling technique.

15. The apparatus of claim 14, wherein the second request is carried in another bit of the Flags field of the power mode change request frame or another bit of the reserved field of the negative acknowledgement control frame.

16. An apparatus for reducing data errors in transceiving of a flash storage interface, comprising:

a lowest layer, coupled to a peer side, comprising a scrambler; and a processing unit, coupled to the lowest layer, repeatedly determining whether a disabling request is received from the peer side when the scrambler is enabled; disabling the scrambler when the disabling request is received from the peer side; repeatedly determining whether an enabling request is received from the peer side when the scrambler is disabled; and enabling the scrambler when the enabling request is received from the peer side, wherein the enabling request and the disabling request are carried in a bit of a Flags field of a power mode change request frame or a bit of a reserved field of a negative acknowledgement control frame.

* * * * *